United States Patent Office 3,652,453
Patented Mar. 28, 1972

3,652,453
DEFOAMER COMPOSITION
Thomas Francis MacDonnell, Newfoundland, N.J., assignor to Diamond Shamrock Corporation, Cleveland, Ohio
No Drawing. Filed Jan. 27, 1970, Ser. No. 6,296
Int. Cl. B01d 17/00, 19/00
U.S. Cl. 252—358                    12 Claims

ABSTRACT OF THE DISCLOSURE

Defoamer compositions are prepared using certain amides and/or hydrocarbon waxes, oil soluble organic polymers, and an inert liquid vehicle, by means of a quick-chilling process. Optionally, castor oil, silicone oil, water, an alkylene oxide-castor oil reaction product, a high molecular weight sulfonated naphthalene condensate, and an emulsifier may be present. The compositions may be used for defoaming and/or preventing foam in other than hydrocarbon oil base systems.

BACKGROUND OF THE INVENTION

(1) Field of the invention

This invention relates to a defoamer composition and to a process for preparing a defoamer composition. As used herein, the term "defoam" is considered to include "knock-down" of existing foam and/or "hold-down" of future foam.

(2) Description of prior art

The foaming of liquids is a frequent cause of trouble in industrial processes. Chemical methods for preventing or reducing the amount of foam include the addition of various organic compounds including alcohols, oils, and the like, various inorganic materials such as talc, silicon oils and the like, and compositions of these materials and the like.

There are many industrial processes in which solutions or suspensions in other than hydrocarbon oil base systems are handled and in which foaming in the system must be diminished or prevented to avoid interference by the foam with the efficient conduct of the process. Examples of such interferences are the foaming of boiler water, foaming in textile processing, the foaming of boiling sugar-beet runoffs, and the foaming of paper pulp suspensions. In addition, it is extremely desirable for paints, coatings, and the like not to foam so as to avoid entrained air bubbles from disfiguring the coated surface. Many more instances in which the diminishing or prevention of foam is desirable will come to mind.

In the paper industry, foaming problems are encountered in the handling of black, brown, red and white liquors, and the like. Black liquor results from cooking pulp-wood in an alkaline solution in the soda or sulfate paper-making process. It contains nearly all of the chemicals employed during the process together with organic matter extracted from the wood. Foaming is increased by the processing of highly resinous woods. The sulfate process uses more resinous woods than the soda process, and for that reason foaming is more severe. The foaming primarily occurs when the wood pulp is washed, and when it is agitated during the screening process.

SUMMARY OF THE INVENTION

It is an object of this invention to provide a novel defoamer composition. The said defoamer composition comprises a quick-chilled mixture of hydrocarbon waxes and/or amides and organic polymers in an inert liquid vehicle, to which also may be added castor oil, silicone oil, water, an alkylene oxide-castor oil reaction product, a high molecular weight sulfonated naphthalene condensate, water and an emulsifier.

It is another object of this invention to provide a novel process whereby the said defoamer composition may be produced. The said process comprises in part heating certain ingredients, quick chilling the ingredients with an inert liquid, reheating, and adding additional ingredients.

Other objects of this invention will become apparent from the further disclosures herein. It is intended, however, that the disclosures herein do not limit the invention but merely indicate preferred embodiments thereof since various modifications within the scope of this invention will become apparent to those skilled in the art.

DESCRIPTION OF THE PREFERRED EMBODIMENTS

Useful amides include those obtained by reaction of a polyamine containing at least one alkylene group having from two to six carbon atoms and a fatty acid having from six to eighteen carbon atoms. One example is the amide obtained by reaction of a polyamine and a fatty acid or mixture of fatty acids such as hexanoic, decanoic, lauric, palmitic, oleic, and stearic acids, hydroxy acids such as ricinoleic acid, or naphthenic acids such as are obtained as byproducts by the refining of petroleum. Natural mixtures of fatty acids such as, tall oil acids, tallow fatty acids and the like also can be used. Suitable amines include ethylene diamine, butylene diamine, diethylene triamine, triethylene tetramine, hexamethylene diamine, decamethylene diamine, hydroxyethyl ethylene diamine, 1:3-diamino-2-propanol or the like.

One of the amides useful herein is prepared in the following manner. 95.7 parts by weight of bleached-hydrogenated tallow fatty acids is charged into a stainless steel reactor with a condenser, water trap and agitator. The entire process including charging of reactants and cooling of the reaction product is carried out under a nitrogen atmosphere. The acids charge is heated to about 165–175° C. and 10.1 parts by weight of ethylene diamine is added with agitation. After the diamine is added, the reaction mixture is heated to about 180–185° C. The mixture is reacted at about 180–185° C. until the acid value is less than 5 and the alkalinity less than 0.6% by weight. The resulting reaction product of ethylene diamine and tallow fatty acid is then cooled to room temperature. If desired, the cooled mass can be ground to obtain the product in the form of a very fine powder.

The liquid hydrocarbon can be any liquid aliphatic, alicyclic, aromatic hydrocarbon or mixture thereof. The hydrocarbon should be liquid at room temperature and atmospheric pressure, have a viscosity of from about 30 to about 400 SUS (Saybolt Universal seconds at 100° F.), a minimum boiling point of at least 70° C. and an average from about 6 to 25 carbon atoms. Suitable hydrocarbons include benzene, heptane, octane, mineral seal oil, stoddard solvent, petroleum naphtha, toluene, xylene, paraffinic mineral oil, naphthenic mineral oil or the like. If desired mixtures of two or more hydrocarbons can be used.

An example of the oil soluble polymer is a copolymer of vinyl acetate and fumaric acid esterified with a tallow alcohol. Such an oil soluble polymer is available from Enjay Chemical Co. in the form of a mineral oil solution thereof under the trademark "Paratone 440" which consists of about 25 parts of weight of said copolymer in 75 parts by weight of a liquid hydrocarbon. This product has the following properties:

Viscosity at 210° F., cs. _____ 1300
Flash Point, COC, ° F. _____ 360
Color, ASTM _____ 40
Specific Gravity 60/60° F. _____ 0.92

Other useful oil soluble polymers include vinyl acetate copolymerized with ethylenically unsaturated comonomers which are copolymerizable therewith such as maleic acid esters, ethylene, propylene and butylene; polyalkylene oxide adducts such as methyl glucoside propoxylated with four moles of propylene oxide; glycerine propoxylated with thirty moles of ethylene oxide and thirty moles of propylene oxide; the copolymer of lauryl methacrylate and vinyl pyrrolidone; methacrylate copolymers dissolved in solvent-refined (100 SUS at 100° F.) neutral oil; and phenol modified coumaroneindene resins. These materials can be used alone or in admixture with each other.

The silicone oil can be polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 100 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane or the like having a viscosity of from about 10 to about 3000 centistokes at 25° C.

The hydrocarbon waxes can include animal waxes such as paper production, the black liquor is an aqueous solution of various chemicals, lignins, and tall oils, and is processed at temperatures of about 70–80° C. A suitable inert liquid vehicle for defoaming the black liquor would therefore be one which is compatible with the composition ingredients, is hydrophobic, and which has a boiling point higher than 90° C. An example of such a suitable vehicle would be mineral oil. Another example would be a hydrocarbon oil base system in which case the inert liquid vehicle could be an alcohol that is liquid at room temperature and whose boiling point is above that of the system to be defoamed, such as ethanol, methanol, and the like.

The reaction product of castor oil and an alkylene oxide having from two to six carbon atoms can be, for example, ethoxylated castor oil in which case from 2 to about 30 parts by weight of ethylene oxide are reacted with about 1 part by weight of castor oil. Another example would be propoxylated castor oil in which case from 2 to about 30 parts by weight of propylene oxide is reacted with about 1 part by weight of castor oil.

The castor oil can be any refined castor oil varying in quality from technical grade (meets Federal Specification JJJ–C–86, Grade 3) to very high quality (meeting Federal Specification JJJ–C–86, Grade 1). The oils may have the following properties:

| | Color (Gardner) | Acid value | Viscosity stokes at 25° C. | Specific gravity, 25° C./25°C. | Iodine value (WIJS) | Hydroxyl value | Saponification value | Pour point ° C. |
|---|---|---|---|---|---|---|---|---|
| Grade 1 | 1+ | 2 | 7.5 | 0.959 | 86 | 164 | 180 | −23.3 |
| Grade 3 | 5 | 5 | 7.5 | 0.959 | 86 | 158 | 180 | −23.3 | as spermaceti, beeswax, stearic acid, Chinese wax, and the like; vegetable waxes such as carnauba, Japan, bayberry, candelilla, and the like; mineral waxes such as ozekerite, montan, ceresin, paraffin, and the like; and synthetic waxes such as the medium weight polyethylenes, polyoxyethylene glycols, polyoxyethylene esters, chloronaphthalenes, shlorotrifluoroethylene resins, and the like. The hydrocarbon waxes can also include microcrystalline waxes and oxidized microcrystalline waxes. For defoaming systems processed at room temperatures or for foam hold down in substances stored at room temperatures, any of the above waxes may be used. However, for defoaming systems operating at above room temperatures, it is desirable that the waxes have melting points from about 90° C. to about 140° C.

Examples of hydrocarbon waxes useful herein are those available from Dura Commodities Corporation and have the following properties:

| Wax | Melting point[1] | Congealing point[1] |
|---|---|---|
| Ruhrwax type A-116 | 117 | 104.5 |
| Ruhrwax type A-616 | 121 | 110.5 |
| Oxidize wax C-20 | 104 | 9.0 |
| Hardwax H-240 | 85.5–93.0 | |
| Ruhrwax AV-1550 | | 93.0 |

[1] About in ° C.

Melting point values are average as determined by ASTM D–127. Congealing point values are average as determined by ASTM D–938.

The inert liquid vehicle can be any liquid carrier which will dissolve, but not react with the other ingredients of the composition. The inert liquid vehicle can be: alcohol; alcohol and an empulsifier; aliphatic, alicyclic or aromatic hydrocarbon solvents or a mixture thereof; animal mineral or vegetable oil; or water and an emulsifier.

The choice of inert liquid vehicle is determined by its compatibility with the other ingredients of the composition, the liquid base of the system to be defoamed and the temperature at which the defoaming is to take place. For example, in the defoaming of black liquor used in The emulsifier can be any cationic, anionic or nonionic emulsifier. The choice of emulsifier will depend upon the defoamer coagulate composition, the inert liquid vehicle, and the system to be defoamed. One example of an oil emulsifier would be a polyethylene ester of a saturated fat in which the glycol portion can vary from ethylene glycol to 600 polyethylene glycol.

An alcohol may be present as a substitute for part or all of the oil soluble polymer. The alcohol may be primary, secondary or tertiary, and may be monohydric or polyhydric. It is preferable that the alcohol be a solid at room temperature. Where the alcohol completely replaces the oil soluble polymer, mineral oil or other hydrocarbon oil need not be included in the composition. An alcohol which is liquid at room temperature can act as the inert liquid vehicle. An example of a useful alcohol is n-hexadecanol. Such an alcohol is available from Archer Daniels Midland Company under the trademark "Adol." The technical grade is sold under the grade designation "54" and has the following properties or specifications:

| | "Adol" 54 |
|---|---|
| Formula | $C_{15}H_{31}CH_2OH$ |
| Cetyl content (approx. percent) | 70 |
| Acid value (max.) | 1.0 |
| OH value | 220–230 |
| Iodine value (max.) | 2.0 |
| Titer ° C. | 46–50 |
| Color, Lovibond (5¼")(max.) | 44/0.4R |
| Saponification value (max.) | 3.0 |
| Acetyl value | 189–196 |
| Viscosity SSU/210° F. (av.) | 40 |
| Calculated molecular weight | 250–258 |
| Boiling range 760 mm. (90%)° C. | 310–345 |
| Specific gravity 60/25° C. (av.) | 816 |

The high molecular weight sulfonated naphthalene condensate may be the sodium salt of naphthalene sulfonic acid condensed with formaldehyde. Such a condensate is available from Diamond Shamrock Chemical Company under the trademark "Lomar." The grade designations "D" and "PW" have the following properties or specifications:

|  | "Lomar" D | "Lomar" PW |
|---|---|---|
| Appearance | Tan powder | Fine tan powder. |
| Active content, percent | 84 | 87. |
| Inert matter (Na$_2$SO$_4$), percent | 11 | 6. |
| Moisture, percent | 5 | 5. |
| Ash, percent | 34 | 32. |
| pH (10% solution) | 9.3 | 9.3. |
| Solubility (aqueous) | Very soluble | Freely soluble. |
| Solution appearance (10% solution) | Clear, amber solution. | Clear solution. |

The parameters of the ingredients of the defoamer composition are as follows:

The amide may be present in from about 1 to about 20 parts by weight.

As a substitute for the amide, the hydrocarbon wax may be present in from about 1 to about 20 parts by weight.

As a substitute for the amide and the hydrocarbon wax, a mixture of the amide and the hydrocarbon wax may be present in from about 1 to about 20 parts by weight.

The oil soluble organic polymer may be present in from about 1 to about 30 parts by weight.

The inert liquid vehicle may be present in from about 20 to about 95 parts by weight.

The reaction product of castor oil and an alkylene oxide having from two to six carbon atoms may be present in up to about 20 parts by weight. Said reaction product can substitute for up to 100% of the castor oil and the high molecular weight sulfonated naphthalene condensate.

The castor oil may be present in up to about 20 parts by weight.

The high molecular weight sulfonated naphthalene condensate may be present in up to about 2 parts by weight.

The silicone oil may be present in up to about 2 parts by weight.

The alcohol may be present in from about 1 to about 30 parts by weight. Said alcohol can substitute for up to 100% of the oil soluble organic polymer.

The emulsifier may be present in up to about 20 parts by weight.

The unique defoamer compositions which are the subject of this invention are prepared by a novel process. Broadly, the process consists of charging a receptacle with the ingredients and proportions desired, heating the ingredients to obtain a melt and quick chilling the melt so as to obtain a coagulate. The quick chilling step yields unexpected results in that the defoamer composition is more effective when this step is employed than when the melt is allowed to cool slowly. Once a coagulate is obtained the composition is reheated to obtain a second melt and then extended by the addition of an inert liquid vehicle, and blended.

More particularly, the process consists of charging a premix tank with a liquid hydrocarbon vehicle; castor oil and sulphonated naphthalene condensate, or alternatively, the reaction product of castor oil and an alkylene oxide; an oil soluble organic polymer; and one of a group consisting of hydrocarbon wax, an amide which is the reaction product of polyamine containing at least one alkylene group having from 2 to 6 carbon atoms and fatty acid having from 6 to 18 carbon atoms, or a mixture of said hydrocarbon wax and said amide. All of the above ingredients may either be mixed in one tank simultaneously, or all of the ingredients with the exception of the amide may be mixed and heated and the amide added thereafter.

The temperature to which these ingredients must be heated is dependent upon their melting point since they must be heated until a uniform melt is obtained. After the uniform melt is obtained the mixture is maintained at a temperature slightly higher than the melting temperature and water at room temperature which may have dissolved therein the high molecular weight sulphonated naphthalene condensate is cautiously added to the mixture. Agitation of the mixture should take place while it is being heated to obtain the melt and should be maintained during the addition of the water to avoid violent flashing of steam. The water acts to quick-chill the melt, causing it to foam and to form a coagulate. The heating of the premix tank, which may be discontinued during the addition of the water, should be resumed after the mixture is completely coagulated. The temperature to which the mixture is reduced upon formation of the coagulate will vary according to the ingredients. For example, where an amide is used which has a melting point of about 140° C. the coagulate will form when the melt has been quick-chilled to about 120° C.

The coagulate at this stage should be reheated until a melt is again obtained. Generally, the physical appearance of the second melt will differ markedly from that of the first melt. For example, where the ingredients of the melt are mineral oil, castor oil, a vinyl acetate fumaric acid copolymer, the stearic diamide of ethylene diamide and the sodium salt of naphthalene sulphonic acid condensed with formaldehyde, the melt obtained upon the first heating is clear, but upon the second heating the melt is cloudy in appearance.

The second melt may be allowed to cool slowly to room temperature upon which it forms a waxy base composition. This base composition is stable and may be stored for an indefinite period of time. The base composition is then extended with an inert liquid vehicle and blended. Depending upon the system to be defoamed and the ingredients of the base composition, silicone oil may be added along with the inert liquid vehicle and it may be necessary to heat the base composition and inert liquid vehicle while blending. Where the inert liquid vehicle is water it will be necessary to add an emulsifier. Variations of the process of preparing these defoamer compositions are specifically stated in, or will become apparent from, the examples which will follow.

The temperature ranges for this process vary with the ingredients and generally are about 60°–200° C. for the two melting steps and about 40°–180° C. upon coagulation or foaming after the quick-chilling step.

The following apparatus and test method was used in determining the effectiveness of various compositions in knocking down and holding down foam in black liquor. The apparatus and method could, however, be used for testing any liquid which forms a foam upon agitation and/or heating.

A 1000 cc. tall form beaker is used as the primary container for the liquid to be tested. A curved glass outlet fused onto the base of the beaker is connected with a rubber hose to a centrifugal pump. The pump is used to circulate continuously the test liquid from the beaker into the pump and back into the beaker. Pumping is carried out at a rate so that the test liquid in the beaker is agitated by the re-entering test liquid to such an extent that foam forms. The pumping rate is about two gallons per minute. Test liquid enters the beaker at a point about 6 centimeters above the surface of the liquid in the beaker and strikes the surface of the liquid in the beaker at an angle of 90°.

In carrying out the testing of the defoamer compositions, 500 cc. of concentrated black liquor is charged at about 82° C. into the beaker. This liquid, when quiescent at 82° C., fills the beaker to a level of about 8.3 centimeters from the bottom. This level is marked and labeled the 0 line. In the test for hold down, 0.1 cc. of defoamer composition is added to the 500 cc. of test liquid in the beaker. The contents of the beaker are warmed to maintain the temperature at 82° C. during the test. The pump and stop watch are started simultaneously. Height of the foam above the 0 line is measured at 15 second intervals for the first minute, then at 30 second intervals, and recorded. An effective defoamer composition will maintain the height of the foam less than 2.0 centimeters above the 0 line for at least 60 seconds. In the test for knockdown, the liquor is agitated and heated prior to the addition of any defoamer composition. After a foam has built up to 7 or 8 centimeters, 0.1 cc. of the defoamer composition to be tested is added and the data is recorded as above.

A test for holddown of foam in a latex paint formulation was conducted by adding the composition to be tested to a latex paint containing no defoamer and shaking on a Red Devil Mixer for ten minutes. The shaken sample was then weighed and this weight was used to calculate the density of the paint (pounds/gallon) and the volume percentage of entrapped air. These figures were then compared with those for unshaken paint, and paint shaken without any defoamer.

EXAMPLE 1

A defoamer composition was prepared using the following ingredients:

| Percentage by weight | Ingredient | Step |
| --- | --- | --- |
| 1.8 | Mineral oil | A |
| 1.0 | Castor oil | A |
| 3.0 | Vinyl acetate fumaric acid copolymer | A |
| 4.0 | Stearic diamide of ethylene diamine | B |
| 1.0 | Water | C |
| 0.2 | Sodium salt of naphthalene sulfonic acid condensed with formaldehyde. | C |
| 3.0 | Mineral oil | D |
| 2.0 | Vinyl acetate fumaric acid copolymer | D |
| 84.8 | Mineral oil | E |
| 0.2 | Silicone oil | F |

The process for preparing this composition is as follows: The ingredients of Step A are charged in a premix tank and heated to 140–145° C. When mixed and uniform, the ingredient of Step B is added at such a rate that the 140–145° C. temperature is maintained. The melt obtained will be clear at 140° C. The ingredients of Step C are premixed separately. Heating the melt from Steps A and B is discontinued and the ingredients from Step C are added cautiously to the melt while it is still at or about 140° C. The agitation used in obtaining a uniform melt should be continued during the addition of the ingredients of Step C. As a result of the addition of the water, the melt will foam and coagulate into a soft paste wax whose temperature will be approximately 120° C. Agitation of the coagulate is continued and the ingredients of Step D are added to the coagulate while it is being reheated to 140° C. as rapidly as possible. Most of the water added in forming the coagulate will flash off as steam immediately and the balance will boil off during the second heating process. Heating is continued for approximately 15 minutes after a uniform melt is obtained. The premix tank discharge valve and drop line should be preheated with steam in order to allow the melt to pass freely through. Drop the melt while at 140° C. through the preheated lines into a tank containing the ingredient of Step E which has been heated to 30° C. Homogenize the mixture at 2000 p.s.i., but do not recycle. Then add the ingredient of Step F and blend thoroughly.

The composition produced in the above manner proved upon testing in the defoaming of black liquor using the test apparatus previously described, to be a superior defoaming agent both as to knockdown and holddown. The above composition was tested according to the methods indicated previously on black liquor from various sources with the following results:

| Black liquor source | Conc. in cc. | Seconds: Foam height in centimeters | | | | | | | |
| --- | --- | --- | --- | --- | --- | --- | --- | --- | --- |
| | | 15 | 30 | 45 | 60 | 90 | 120 | 150 | 180 |
| Brunswick, Ga. | 0.1 | 1.0 | 1.0 | 1.0 | 1.5 | 2.0 | 2.5 | 3.0 | 3.5 |
| Brunswick (Knockdown) | 0.1 | 1.0 | 1.0 | 1.0 | 1.5 | 2.0 | 2.5 | 3.0 | 3.5 |
| Owens, Ill. | 0.1 | 1.0 | 1.5 | 1.5 | 2.0 | 2.5 | 3.0 | 3.5 | 4.0 |
| Owens (Knockdown) | 0.1 | 1.0 | 2.0 | 2.5 | 2.5 | 3.0 | 3.0 | 3.5 | 4.0 |
| RSU-1 Liquor | 0.1 | 0.5 | 0.5 | 0.5 | 1.0 | 1.0 | 1.5 | 2.0 | 2.0 |
| RSU-1 (Knockdown) | 0.1 | 0.5 | 1.0 | 1.0 | 1.0 | 1.5 | 2.0 | 2.5 | 2.5 |

EXAMPLE 2

Example 1 was repeated with the exception that the ingredients of Step D were 8.0% mineral oil and 2.0% vinyl acetate fumaric copolymer and the ingredient of Step E was 79.8% mineral oil.

EXAMPLE 3

A defoamer composition was prepared using the following ingredients:

| Parts by weight | Ingredient | Step |
| --- | --- | --- |
| 64.55 | Paraffin oil | A |
| 3.00 | Ethylene bis-stearamide | A |
| 4.00 | Castor oil, Grade No. 1 | A |
| 0.20 | Silicone oil, 200–250 c.s. | A |
| 0.05 | Sodium salt of naphthalene sulfonic acid condensed with formaldehyde. | B |
| 1.00 | Water | B |
| 4.00 | Vinyl acetate fumaric acid copolymer | C |
| 4.00 | Castor oil, Grade No. 3 | C |
| Approx. 20.00 | Mineral oil | D |

The process for preparing this composition is as follows: Heat the ingredients of Step A to 140° C. Add the ingredients of Step B, forming a foam/coagulate. Add the ingredients of Step C which should be preheated to 30° C., and homogenize the mixture. Then adjust the composition to 100% by weight with the ingredient of Step D and blend thoroughly. Some water will be retained in this composition.

EXAMPLE 4

A defoamer composition was prepared using the following ingredients:

| Parts by weight | Ingredient | Step |
| --- | --- | --- |
| 5.00 | Ethylene bis-stearamide | A |
| 5.00 | Vinyl acetate fumaric acid copolymer | A |
| 40.00 | Mineral oil | A |
| 0.01 | Sodium salt of naphthalene sulfonic acid condensed with formaldehyde. | B |
| 0.50 | Water | B |
| 15.00 | Product of Steps A and B | C |
| 24.90 | Mineral oil | C |
| 0.10 | Silicone oil | D |
| 10.00 | Mineral oil | D |

The process for preparing this composition is as follows: Heat the ingredients of Step A to 140° C. Mix the ingredients of Step B and add them to those of Step A, thereby forming a foam/coagulate and reducing the temperature. Mix the ingredients of Step C and heat to 140° C. Continue mixing while gradually cooling the mixture to 30° C. Add the ingredients of Step D which have been preheated to 30° C. and mix well. No homogenization is necessary. It is important that the composition be mixed while cooling prior to the addition of the ingredients of Step D, to avoid the possibility of an increase of viscosity due to crystallization. Such crystallization will not necessarily occur, but if it should occur it could be prevented by the inclusion of an emulsifier such as the polyethylene ester of a saturated fat.

EXAMPLE 5

A defoamer composition was prepared with the following ingredients:

| Parts by weight | Ingredient | Step |
|---|---|---|
| 8.00 | Stearic diamide of ethylene diamine | A |
| 2.0 | Castor oil, Grade No. 3 | B |
| 6.0 | Vinyl acetate fumaric acid copolymer | C |
| 0.4 | Sodium salt of naphthalene sulfonic acid condensed with formaldehyde | D |
| 0.2 | Silicone oil, 200–250 c.s. | E |
| 83.4 | Paraffin oil | F |

The process for preparing this composition is as follows: To prepare a 1000 gram sample, combine in a 1500 cc. beaker 60 grams of ingredient C, 20 grams of ingredient B, 4 grams of ingredient D and 36 grams of ingredient F. Stir gently and add 80 grams of ingredient A. Place on a hot plate and heat the mixture to 140° C. Remove from the hot plate, place in a hood and very slowly add 20 grams of water stirring constantly. The mixture will coagulate. Add 100 grams of ingredient F and heat to 140° C. Cool with 698 grams of ingredient F. Homogenize, add 2 grams of ingredient E, and blend thoroughly.

The above composition was tested according to the methods indicated previously on black liquor from various sources with the following results:

| Black liquor source | Conc. in cc. | Seconds: Foam height in centimeters | | | | | | | |
|---|---|---|---|---|---|---|---|---|---|
| | | 15 | 30 | 45 | 60 | 90 | 120 | 150 | 180 |
| Owens, Ill | 0.1 | 1.0 | 1.0 | 1.0 | 1.5 | 1.5 | 1.5 | 2.0 | 2.0 |
| Brunswick, Ga | 0.1 | 0.5 | 0.5 | 0.5 | 1.0 | 1.5 | 2.0 | 2.5 | 3.0 |
| Brunswick, Ga | 0.1 | 0.5 | 0.5 | 1.0 | 1.5 | 2.0 | 2.5 | 2.5 | 3.0 |

EXAMPLE 6

A defoamer composition was prepared using the following ingredients.

| Ingredient: | Percentage by wt. |
|---|---|
| (A) High molecular weight synthetic polymer containing both amide and carboxylic groupings | 0.1 |
| (B) Castor oil, Grade #3 | 15.0 |
| (C) Ethoxylated octyl phenol | 5.0 |
| (D) Stearic diamide of ethylene diamine | 5.0 |
| (E) Silicone oil | 0.3 |
| (F) Paraffin oil | 74.6 |

The process for preparing this composition is to charge a tank with all of the above ingredients except ingredient A, and heat to about 149° C. The melt formed is then quick-chilled by the addition of water containing ingredient A, which forms a foam that coagulates upon exposure to the air. The expansion in volume is dependent upon the rate at which the water is added and ranges up to ten times the original volume. The mixture is then homogenized, and extended with water as a carrier.

EXAMPLE 7

A defoamer composition was prepared using the following ingredients.

| Ingredient: | Parts by wt. |
|---|---|
| Ethylene bis-stearamide | 2.0 |
| n-Hexadecanol | 10.0 |
| Paraffin oil | 77.25 |
| Silicone oil | 0.5 |
| Sodium salt of naphthalene sulfonic acid condensed with formaldehyde | 0.5 |

The process for preparing this composition is essentially that of Example 6, except that the mixture is heated to 140° C. and 2.0 parts by weight of water are added so as to quick-chill and form a coagulate. Then 8 parts by weight of vinyl acetate fumaric acid copolymer are added together with 0.2 part by weight of silicone oil.

EXAMPLE 8

A defoamer composition was prepared using the following ingredients.

| Ingredient: | Percentage by wt. |
|---|---|
| Ruhrwax A-116 | 4.0 |
| Stearic diamide of ethylene diamine | 4.0 |
| Silicone oil, 200–250 cs. | 0.2 |
| Paraffin oil | 81.8 |

The process for making this composition is to melt all of the above ingredients in a tank at approximately 117° C., cool, add 10.0 parts by weight vinyl acetate fumaric acid copolymer and blend.

What is claimed is:

1. A process for preparing a defoamer composition comprising
    (A) charging a receptacle with
        (a) liquid hydrocarbon vehicle,
        (b) an oil soluble organic polymer,
        (c) at least one of a group consisting of
            (i) a wax which is at least one of a group consisting of animal wax, vegetable wax, mineral wax, synthetic wax, microcrystalline wax and oxidized microcrystalline wax, and
            (ii) an amide which is the reaction product of polyamine containing at least one alkylene group having from two to six carbon atoms selected from at least one of the group consisting of ethylene diamine, butylene diamine, diethylene triamine, triethylene tetramine, hexamethylene diamine, decamethylene diamine, hydroxyethyl ethylene diamine, and 1:3-diamino-2-propanol, and fatty acid having from six to eighteen carbon atoms selected from at least one of the group consisting of hexanoic acid, decanoic acid, lauric acid, palmitic acid, oleic acid, stearic acid, ricinoleic acid, naphthenic acids, tall oil acids, tallow fatty acids, and hydrogenated tallow fatty acid, and
    (d) optionally, one of a group consisting of
        (i) castor oil and a sulfonated naphthalene condensate, and
        (ii) the reaction product of castor oil and an alkylene oxide,
    (B) heating the mixture to from about 60° C. to about 200° C. to obtain a uniform melt then,
    (C) forming a coagulate by rapidly cooling the melt to from about 40° C. to about 180° C. by the addition of water, then
    (D) reheating the mixture to from about 60° C. to about 200° C. to obtain a uniform melt, adding thereto an inert liquid vehicle, and blending.

2. A process according to claim 1 wherein
    (A) the mixture from said charging step (A) is heated to from about 70° C. to about 150° C. so that a clear, uniform melt is obtained, then
    (B) the heating is discontinued while the melt is at a temperature sufficient to maintain its molten state and water is slowly added thereto in sufficient quantity to cool the melt rapidly until a coagulate is formed during which cooling continuous agitation is maintained, then
    (C) the coagulate is reheated to from about 70° C. to about 150° C. to obtain a cloudy, uniform melt, adding thereto inert liquid vehicle which has been preheated, then
    (D) the melt and inert liquid vehicle are homogenized, silicone oil is added and the mixture is blended.

3. A process according to claim 1 wherein the amide is the stearic diamide of ethylene diamine.

4. A process according to claim 3 wherein
    (A) the mixture from said charging step (A) is heated to about 140°–145° C. so that a clear, uniform melt is obtained, then (B) the heating is discontinued while the melt is at about 140° C. and water is slowly added thereto in sufficient quantity to cool the melt rapidly to about 120° C., during which cooling continuous agitation is maintained, resulting in a coagulate, then (C) the coagulate is reheated to about 140–145° C. to obtain a cloudy, uniform melt, inert liquid vehicle which has been preheated is added thereto, then (D) the melt and an inert liquid vehicle are homogenized, silicone oil is added, and the mixture is blended.

5. A process according to claim 1 wherein the oil soluble organic polymer is an oil soluble copolymer of vinyl acetate and fumaric acid esterified with a tallow alcohol.

6. A process according to claim 1 wherein the liquid hydrocarbon vehicle is mineral oil.

7. A process according to claim 1 wherein the inert liquid vehicle is one of a group consisting of: water and an emulsifier; alcohol; mineral oil; an aliphatic hydrocarbon; an alicyclic hydrocarbon; an aromatic hydrocarbon; and a mixture of said hydrocarbons.

8. A process according to claim 1 wherein the alkylene oxide is selected from the group consisting of ethylene oxide and propylene oxide.

9. A process according to claim 1 wherein the reaction product of castor oil and alkylene oxide is present in the proportions of about 0.1 to about 20 parts by weight.

10. A process according to claim 1 wherein the castor oil is present in the proportion of about 0.1 to about 20 parts by weight and the sulfonated naphthalene condensate is present in the proportion of about 0.01 to about 2 parts by weight.

11. A process according to claim 1 wherein the oil soluble organic polymer is an oil soluble copolymer of vinyl acetate and fumaric acid esterified with a tallow alcohol; the liquid hydrocarbon vehicle is mineral oil; castor oil and the sodium salt of naphthalene sulfonic acid condensed with formaldehyde are present; and the reaction product of castor oil and an alkylene oxide is not present.

12. The product of the process of claim 1.

References Cited
UNITED STATES PATENTS

| | | | |
|---|---|---|---|
| 2,230,556 | 2/1941 | Zimmer | 252—321 |
| 2,366,727 | 1/1945 | Gunderson | 252—321 |
| 3,180,836 | 3/1965 | Jurish | 252—321 |

JOHN D. WELSH, Primary Examiner

U.S. Cl. X.R.

252—321

PO-1050
(5/69)

UNITED STATES PATENT OFFICE
CERTIFICATE OF CORRECTION

Patent No. 3,652,453          Dated March 28, 1972

Inventor(s) Thomas Francis MacDonnell

It is certified that error appears in the above-identified patent and that said Letters Patent are hereby corrected as shown below:

Column 2, line 26, "by" should be --from--. Column 3, line 40, after "chloronaphthalenes," insert --sorbitols,--; column 3, line 41, "shlorotrifluoroethylene" should be --chlorotrifluoroethylene--; column 3, table starting at line 54, "Oxidize" should be --Oxidized--. Column 4, line 69, "816" should be --.816--.

Signed and sealed this 9th day of January 1973.

(SEAL)
Attest:

EDWARD M. FLETCHER, JR.
Attesting Officer

ROBERT GOTTSCHALK
Commissioner of Patents